(12) United States Patent
Jenne et al.

(10) Patent No.: US 11,520,396 B2
(45) Date of Patent: *Dec. 6, 2022

(54) POWER MANAGEMENT SYSTEM

(71) Applicant: Dell Products L.P., Round Rock, TX (US)

(72) Inventors: John Erven Jenne, Austin, TX (US); Craig Anthony Klein, Elgin, TX (US); Mark A. Muccini, Georgetown, TX (US); Dit Charoen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 115 days.

This patent is subject to a terminal disclaimer.

(21) Appl. No.: 16/950,572

(22) Filed: Nov. 17, 2020

(65) Prior Publication Data

US 2021/0064112 A1 Mar. 4, 2021

Related U.S. Application Data

(63) Continuation of application No. 16/179,137, filed on Nov. 2, 2018, now Pat. No. 10,852,804.

(51) Int. Cl.
| | |
|---|---|
| *G06F 1/32* | (2019.01) |
| *G06F 1/3206* | (2019.01) |
| *G06F 1/3287* | (2019.01) |
| *G06F 1/3296* | (2019.01) |
| *G06F 1/24* | (2006.01) |
| *G06F 1/30* | (2006.01) |

(52) U.S. Cl.
CPC .......... *G06F 1/3206* (2013.01); *G06F 1/3287* (2013.01); *G06F 1/3296* (2013.01); *G06F 1/24* (2013.01); *G06F 1/30* (2013.01)

(58) Field of Classification Search
None
See application file for complete search history.

(56) References Cited

U.S. PATENT DOCUMENTS

| | | | |
|---|---|---|---|
| 9,667,060 B1 | 5/2017 | Sizikov | |
| 2008/0222435 A1 | 9/2008 | Bolan et al. | |
| 2009/0282274 A1 | 11/2009 | Langgood et al. | |
| 2018/0323643 A1* | 11/2018 | Arar | H02J 3/14 |
| 2019/0332155 A1 | 10/2019 | Humphrey et al. | |

* cited by examiner

*Primary Examiner* — Fahmida Rahman
(74) *Attorney, Agent, or Firm* — Joseph Mencher

(57) ABSTRACT

A power management system includes a first power grid coupled to a first circuit breaker, and a first power distribution unit coupled to the first circuit breaker. A server device includes server components, and at least one first power supply unit coupled to the first power distribution unit. A power management subsystem in the server device is coupled to the server components and the at least one first power supply unit. The power management subsystem monitors a first input current draw of each first power supply unit, and determines whether the first input current draw exceeds a first input current limit that is based on the first circuit breaker. In response the first input current draw exceeding the first input current limit, the power management subsystem throttles the server components to reduce the first input current draw below the first input current limit.

20 Claims, 7 Drawing Sheets

POWER MANAGEMENT SYSTEM

CROSS-REFERENCE TO RELATED APPLICATIONS

The present disclosure is a continuation of U.S. patent application Ser. No. 16/179,137, filed on Nov. 2, 2018, the disclosure of which is incorporated by reference herein in its entirety.

BACKGROUND

The present disclosure relates generally to information handling systems, and more particularly to power management for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems that are configured to perform critical functions such as, for example, server devices in a datacenter, are often provided with redundant power supplied through circuit breakers coupled to respective independent power grids. Conventionally, circuit breakers are often sized for failover based on a total Power Supply Unit (PSU) capacity of the PSUs in the server devices coupled to that circuit breaker. However, sizing circuit breakers in such a manner typically results in "stranded power" (i.e., allocated power that is not actually utilized by the server devices), particularly when the PSUs in the server devices are oversized compared to the actual power loads of their server devices. Conventionally, stranded power is reduced by capping per-server-device power to a specified power level, which allows the administrator of the datacenter to size circuit breakers for failover based on the total capped power for the server devices coupled to that circuit breaker or, given a particular circuit breaker size, to limit the server devices coupled to that circuit breaker based on the total capped power of those server devices. However, such conventional solutions suffer from a number of shortcomings.

For example, most general use circuit breakers are defined by a current rating (e.g., 20 A). "I2T" or ampere-squared-second terms are used to help show the amount of heat or energy it takes to trip such circuit breakers. As such, server device power capping provides indirect protection, and requires that the administrator of the datacenter convert from a current limit to a power limit. In order to protect against the highest possible input current (i.e., when the voltage sags), the server device power capping based on current conversions using the lowest operable input voltage will result in stranded power. To provide a specific example, 220 nominal volts (V) of alternating current power can operate down to 170V, and capping power for a 50 amp (A) circuit breaker coupled to a rack of server devices based on 170V strands $[(220V-170V)*50 A]=2500$ watts (W) of the possible $[220V*50 A]=11,000$ W that are available. As such, the power limit in this example is 2500 W lower than is required due to voltage sag issues.

Furthermore, conventional server device power capping provides a single power limit level per server device, which either assumes identical independent power grids, circuit breakers, and/or other power system components, or requires the system to be set for the lowest capability power grid, circuit breaker, and/or other components. As such, stranded power can result, particularly when the system includes a primary power grid that supplies more power than the secondary power grid, and the circuit breakers are sized differently. Furthermore, newer generation server devices are often provided in an existing infrastructure, and such single per-server-device power limit levels do not support a power grid fault tolerant redundant configuration which would allow the typically higher-powered newer generation server devices to operate at full (or higher) workloads when both power grids are available, and at throttled (or reduced) workloads upon the unavailability of one of the power grids. Finally, hardware backup solutions are typically not available, or require that a baseboard management controller in the server device know that the server device is about to go offline due to an impending reset.

Accordingly, it would be desirable to provide an improved power management system.

SUMMARY

According to one embodiment, an Information Handling System (IHS) includes a processing system; and a memory system that is coupled to the processing system and that includes instructions that, when executed by the processing system, cause the processing system to provide a power management subsystem that is configured to: monitor a first input current draw of at least one first power supply unit that is coupled to a first power grid via a first circuit breaker; determine whether the first input current draw exceeds a first input current limit that is based on the first circuit breaker; and throttle, in response the first input current draw exceeding the first input current limit, at least one system component to reduce the first input current draw below the first input current limit.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
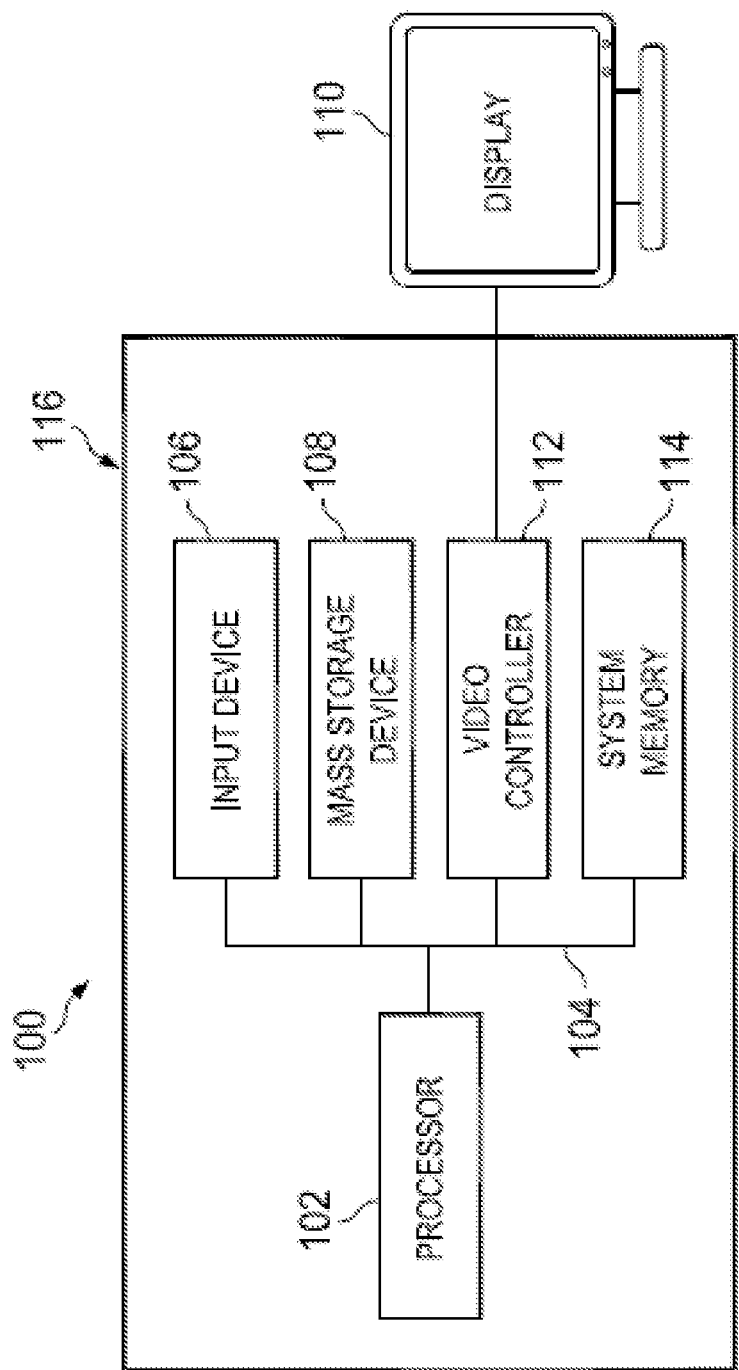
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
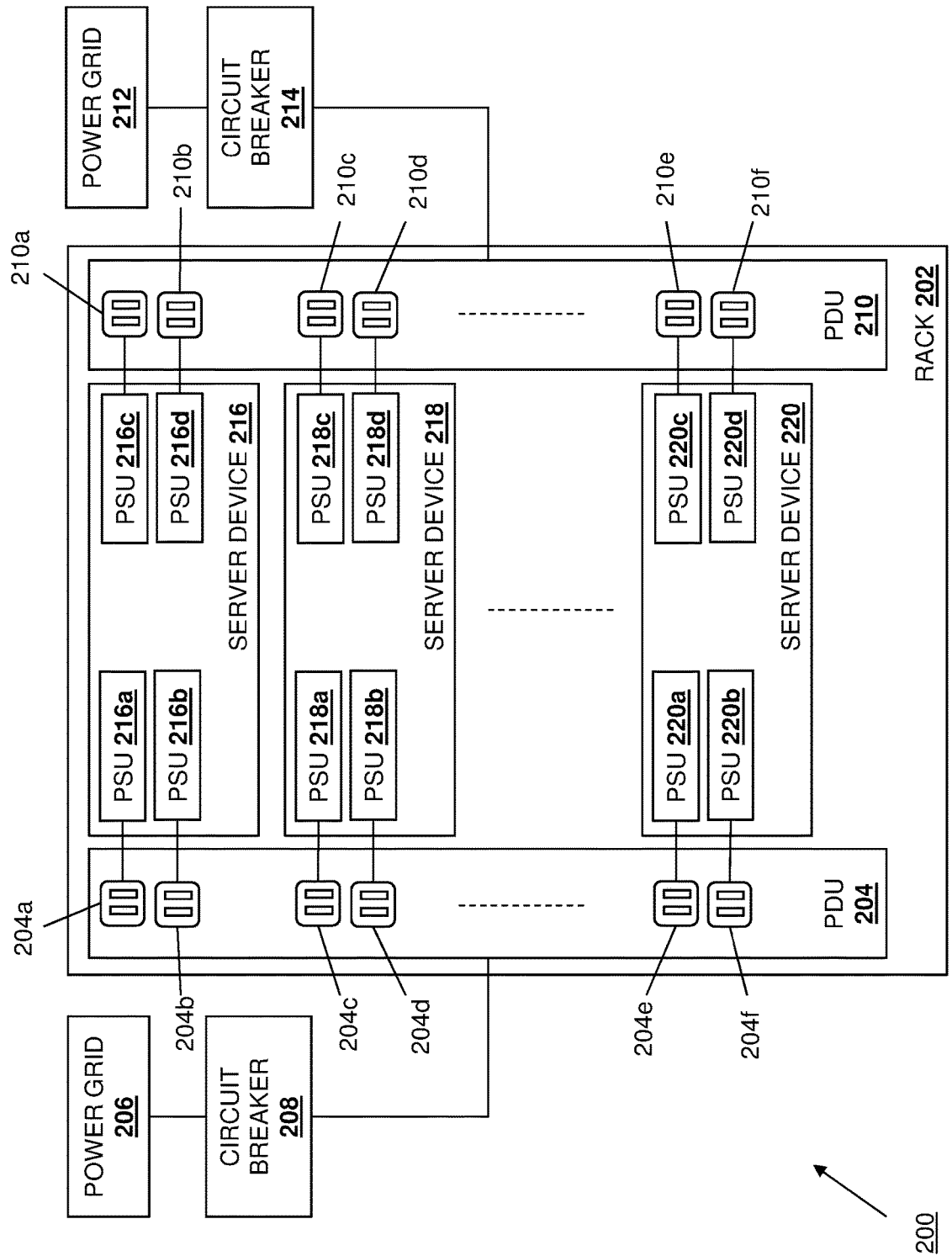
FIG. 2 is a schematic view illustrating an embodiment of a power management system according to the teachings of the present disclosure.

Referring now to FIG. 2, an embodiment of a power management system 200 according to the teachings of the present disclosure is illustrated. In the illustrated embodiment, the power management system 200 includes a rack 202 that, in the examples provided below, is a server rack that is used to house a plurality of server devices. However, in other embodiments, the rack 202 may be omitted, used to house other types of devices, and/or modified in a variety of manners that will be apparent to one of skill in the art in possession of the present disclosure. The rack 202 includes a power distribution unit (PDU) 204 that, in some of the examples discussed below, may also be referred to as a "first" PDU 204. The PDU 204 is coupled to a power grid 206 via a circuit breaker 208, each of which may be referred to below as a "first" power grid 206 and a "first" circuit breaker 208, respectively. The rack 202 also includes a PDU 210 that, in some of the examples discussed below, may also be referred to as a "second" PDU 210. The PDU 210 is coupled to a power grid 212 via a circuit breaker 214, each of which may be referred to below as a "second" power grid 212 and a "second" circuit breaker 214, respectively. As would be understood by one of skill in the art, the power grids 206 and 208 may be connected to a local power utility company, with each power grid 206 and 208 connected to national grid sectors via a separate transformer in order operate independently and ensure operation of at least one of the power grids should the other become unavailable. However, while a specific example has been described, one of skill in the art in possession of the present disclosure will recognize that a variety of datacenter power distribution technologies/architectures may be provided (e.g., with an Uninterruptible Power Supply (UPS) between the circuit breakers and the PDUs that may operate to provide line conditioning that ensures a clean power source for end devices, generators utilized in addition to (or in place of) a second power grid, an Automatic Transfer Switch (ATS), etc.) while remaining within the scope of the present disclosure as well. Furthermore, the circuit breakers 208 and 214 may be provided by automatically-operating electrical switches that are configured to protect electrical circuit(s), wiring, equipment, etc. connected to the power grids 206 and 212, respectively, from damage by excess current that may be drawn via the PDUs 204 and 210 by the power supply units in the server devices discussed below.

In the illustrated embodiment, the rack 202 includes a plurality of server devices 216, 218, and up to 220, any or all of which may be provided by the IHS 100 discussed above with reference to FIG. 1, and/or that may include any or all of the components of the IHS 100. As discussed above, while illustrated and described as server devices, one of skill in the art in possession of the present disclosure will recognize that the power management system of the present disclosure may be beneficial for a variety of devices (e.g., networking devices, storage devices, and/or other computing devices that would be apparent to one of skill in the art in possession of the present disclosure), and thus its application to those devices is envisioned as falling within the scope of the present disclosure as well. Each of the plurality of server device 216-220 includes a plurality of power supply units (PSUs) such as the PSUs 216a, 216b, 216c, and 216d included in the server device 216; the PSUs 218a, 218b, 218c, and 218d included in the server device 218; and the PSUs 220a, 220b, 220c, and 220d included in the server device 220. In the illustrated embodiment, the PSUs 216a and 216b in the server device 216 are connected the PDU 204 via its respective power connections 204a and 204b, the PSUs 218a and 218b in the server device 218 are connected the PDU 204 via its respective power connections 204c and 204d, and the PSUs 220a and 220b in the server device 220 are connected the PDU 204 via its respective power connections 204e and 204f.

Similarly, the PSUs 216c and 216d in the server device 216 are connected the PDU 210 via its respective power connections 210a and 210b, the PSUs 218c and 218d in the server device 218 are connected the PDU 210 via its respective power connections 210c and 210d, and the PSUs 220c and 220d in the server device 220 are connected the PDU 210 via its respective power connections 210e and 210f. While a specific power management system 200 is illustrated and described herein, one of skill in the art in possession of the present disclosure will recognize that a wide variety of modification to the power management system 200 illustrated in FIG. 2 will fall within the scope of the present disclosure well, including different numbers of power grids/circuit breakers/PDUs providing power to the server devices 216-220, different numbers of PSUs provided in the server devices 216-220, etc. In particular, while each server device 216-220 includes four PSUs in the illustrated embodiment, one of skill in the art in possession of the present disclosure will recognize that a vast majority of server devices utilize a two PSU system, with the PSUs provided in a 1+1 power grid redundant configuration, an such server devices will fall within the scope of the present disclosure as well.

Figure 3:
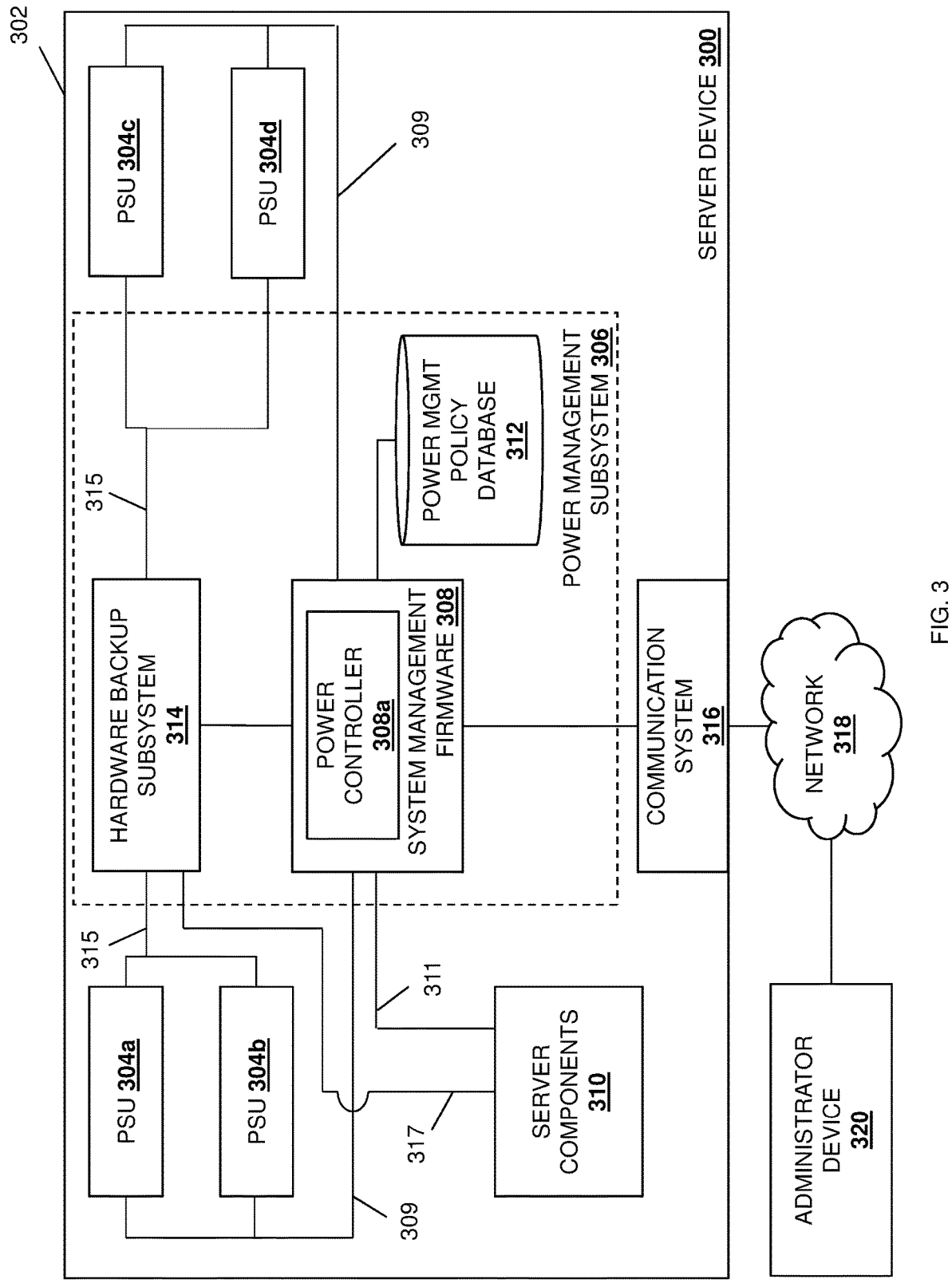
FIG. 3 is a schematic view illustrating an embodiment of a server device that may be utilized in the power management system of the present disclosure.

Referring now to FIG. 3, an embodiment of a server device 300 that may be utilized in the power management system of the present disclosure is illustrated. The server device 300 may be provided as any or all of the server devices 216-220 discussed above with reference to FIG. 2 and, as such, the server device 300 may be provided by the IHS 100 discussed above with reference to FIG. 1, and/or may include some or all of the components of the IHS 100. Furthermore, as also discussed above with regard to the server devices 216-220, the server device 300 may be replaced with networking devices, storage devices, and/or other computing devices while remaining within the scope of the present disclosure as well. In the illustrated embodiment, the server device 300 includes a chassis 302 that houses the components of the server device 300, only some of which are illustrated in FIG. 3. For example, in the illustrated embodiment, the chassis 302 houses PSUs 304a, 304b, 304c, and 304d, which in the examples below may correspond to the PSUs 216a, 216b, 216c, and 216d included in the server device 216, respectively; the PSUs 218a, 218b, 218c, and 218d included in the server device 218, respectively; and/or the PSUs 220a, 220b, 220c, and 220d included in the server device 220, respectively. As such, the PSUs 304a and 304b may be coupled to the power grid 206 via the circuit breaker 208, and the PSUs 340c and 304d may be coupled to the power grid 212 via the circuit breaker 214.

The chassis 302 also houses a power management subsystem 306 that, in the illustrated embodiment, includes system management firmware 308. For example, the system management firmware 308 may be provided on a Baseboard Management Controller (BMC) such as, for example, the integrated DELL® Remote Access Controller (iDRAC) available from DELL® Inc. of Round Rock, Tex., United States. However, one of skill in the art in possession of the present disclosure will recognize that other components may be utilized to provide the functionality of the system management firmware 308 and power management subsystem 306 discussed below while remaining within the scope of the present disclosure as well. In the examples discussed below, the system management firmware 308 is configured (e.g., via combinations of hardware and software) to provide a power controller 308a that performs the power management functionality discussed below (i.e., in addition to conventional system management firmware functionality performed by the system management firmware 306).

In the illustrated embodiment, the power controller 308a/system management firmware 308 is coupled to each of the PSUs 304a-304d via coupling(s) 309 between the system management firmware 308 and the PSUs 304a-304b, as well as to server components 310 that are housed in the chassis 302 via coupling(s) 311 between the system management firmware 308 and the server components 310. For example, the couplings 309 and/or 311 may be provided by one or more digital bus systems that would be apparent to one of skill in the art in possession of the present disclosure. In an embodiment, the server components 310 may include processing systems (not illustrated, but which may include the processor 102 discussed above with reference to FIG. 1), memory systems (not illustrated, but which may include the memory 114 discussed above with reference to FIG. 1), networking systems, and/or any other server components that would be apparent to one of skill in the art in possession of the present disclosure. The power controller 308a/system management firmware 308 is also coupled to a storage device (not illustrated, but which may include the storage device 108 discussed above with reference to FIG. 1) that is housed in the chassis 302 and that includes a power management policy database 312 that is configured to store any of the information utilized by the power management subsystem 306 (e.g., the power controller 308a/system management firmware 308) as described below.

In the illustrated embodiment, the power management subsystem 306 also includes a hardware backup subsystem 314 that is coupled to the power controller 308a/system management firmware 308. For example, the hardware backup subsystem 306 may be provided by a Complex Programmable Logic Device (CPLD) operating in conjunction with hardware in the PSUs 304a-204d and/or other components of the server device 300. However, one of skill in the art in possession of the present disclosure will recognize that other components may be utilized to provide the functionality of the system management firmware 308 and hardware backup subsystem 314 discussed below while remaining within the scope of the present disclosure as well. In the illustrated embodiment, the hardware backup subsystem 314 is coupled to each of the PSUs 304a-304d via coupling(s) 315 between the hardware backup subsystem 314 and the PSUs 304a-304b, as well as to the server components 310 via coupling(s) 317 between the hardware backup subsystem 314 and the server components.

The chassis 302 may also house a communication system 316 that is coupled to the power controller 308a/system management firmware 308 in the power management subsystem 206, and that may include a Network Interface Controller (NIC), a wireless communication subsystem (e.g., a BLUETOOTH® communication subsystem, a Near Field Communication (NFC) subsystem, a WiFi communication subsystem, etc.), and/or other wireless communication components that would be apparent to one of skill in the art in possession of the present disclosure. As illustrated, the communication system 316 may be coupled (e.g., via an Ethernet connection) to a network 318 that may be provided by a Local Area Network (LAN), the Internet, and/or other networks that would be apparent to one of skill in the art in possession of the present disclosure, and an administrator device 320 (e.g., a desktop computing device, a laptop/notebook computing device, a tablet computing device, a mobile phone, etc.) may be coupled to the network 318 as well to allow the communications between the administrator device 320 and the server device 300 discussed below. While a specific server device 300 has been illustrated and described, one of skill in the art in possession of the present disclosure will recognize that server devices may include a variety of components for providing conventional server device functionality, as well as the functionality described below, while remaining within the scope of the present disclosure as well.

Figure 4:
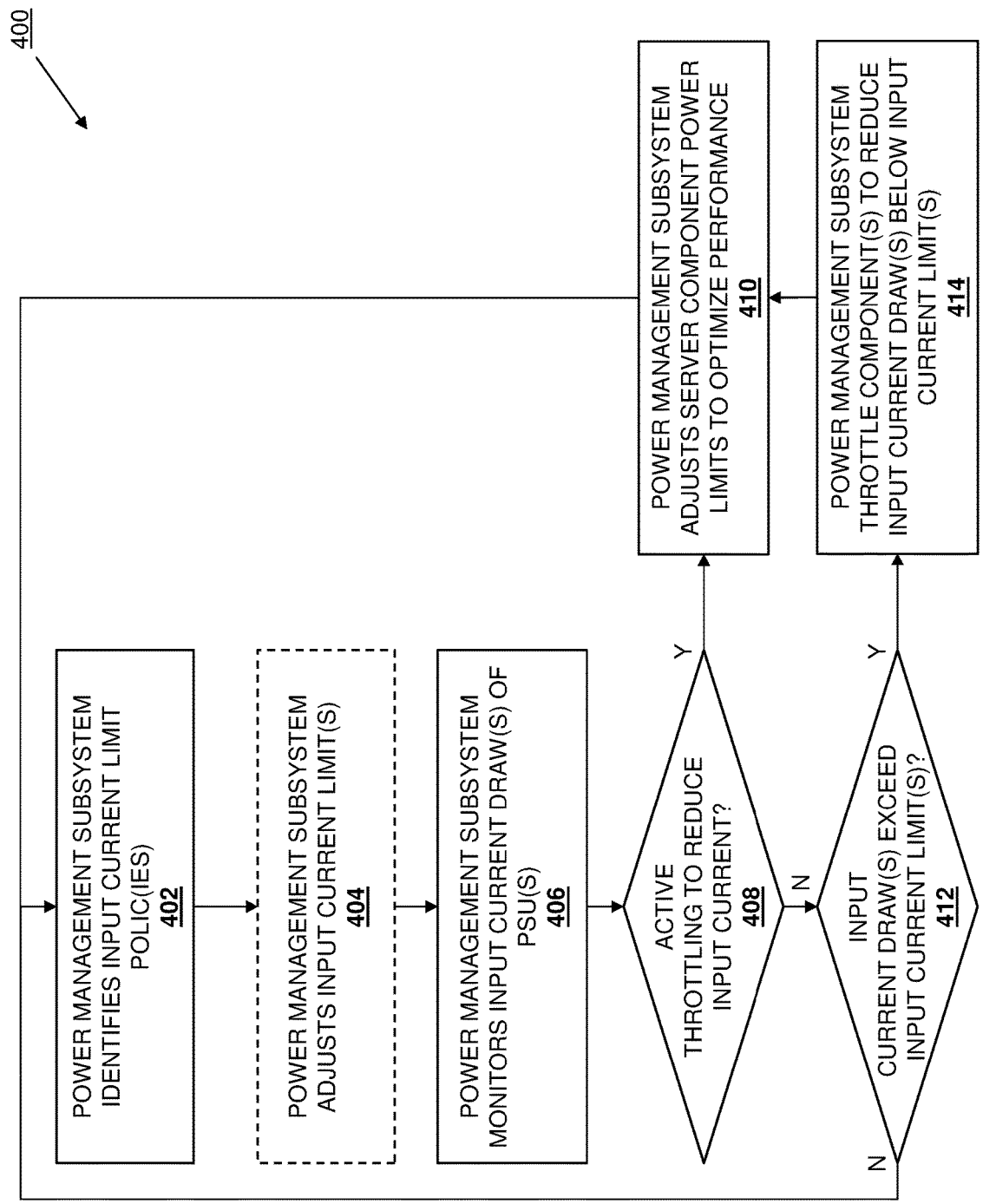
FIG. 4 is a flow chart illustrating an embodiment of a method for managing power.

Referring now to FIG. 4, an embodiment of a method 400 for managing power is illustrated. As discussed below, embodiments of the systems and methods of the present disclosure provide a firmware-based power controller that executes firmware-based power controller policies that allow the input current draw of power supply unit(s) in a server/system from the power grid to which they are coupled to be limited based on the respective circuit breaker through which they are coupled to that power grid, which allows those circuit breaker(s) to be sized for failover according to a total input current limit. Furthermore, if a particular sized circuit breaker couples the power supply unit(s) to a power grid, servers/systems may be coupled to the circuit breaker(s) as per the total input current limit. Further still, when the server/system includes different power supply units that are coupled to different power grids, the firmware-based power controller policies allow for different input current limits for power supply unit(s) in the server/system coupled to different power grid that may be based on the different sized circuit breaker used to couple the power supply units to those different power grids. Finally, a hardware-based subsystem may be provided to trigger server/system throttling when the firmware-based power controller is unavailable or unable to respond quickly enough, and may be configured to take over for the firmware-based power controller regardless of whether the firmware-based power controller is aware it is about to go offline due to a coming server/system reset.

In an embodiment, during or prior to the method 400, a mapping of power supply units to power grids may be provided and/or determined. For example, a mapping of the power supply units in any or all of the server devices 216-220 to the power grids 206 and 212 may be provided to the power controller 308a in each server device 300 by a user, or determined by the power controller 308a in each server device 300. In a specific example, power supply unit slots, which are included in the server devices and configured to receive the power supply units, may be statically mapped to the power grids to which they are connected via the PDUs and circuit breakers in, for example, a platform power budget table stored in a baseboard management controller such as the iDRAC available from DELL® Inc. of Round Rock, Tex., United States. Such mappings may be provided manually by an administrator or other user (e.g., via the administrator device 320 and through the network 318), or determined dynamically by the power controller 308a using techniques that would be apparent to one of skill in the art in possession of the present disclosure.

The method 400 begins at block 402 where a power management subsystem identifies one or more input current limit policies. In an embodiment, at block 402, the power controller 308a provided by the system management firmware 308 in the power management subsystem 306 may identify one or more input current limit policies. In some examples, one or more input current limit policies may be enabled or disabled by an administrator or other user through the network 318 via the administrator device 320. For example, FIGS. 5 and 6 illustrate an administrator device 500 (which may be the administrator device 320 of FIG. 3) including a chassis 502 that houses a display subsystem 502, with that display subsystem 502 displaying graphical user interfaces that are configured to allow the administrator or other user to enable or disable input current limit policies and/or other power management policies that would be apparent to one of skill in the art in possession of the present disclosure.

Figure 5A:
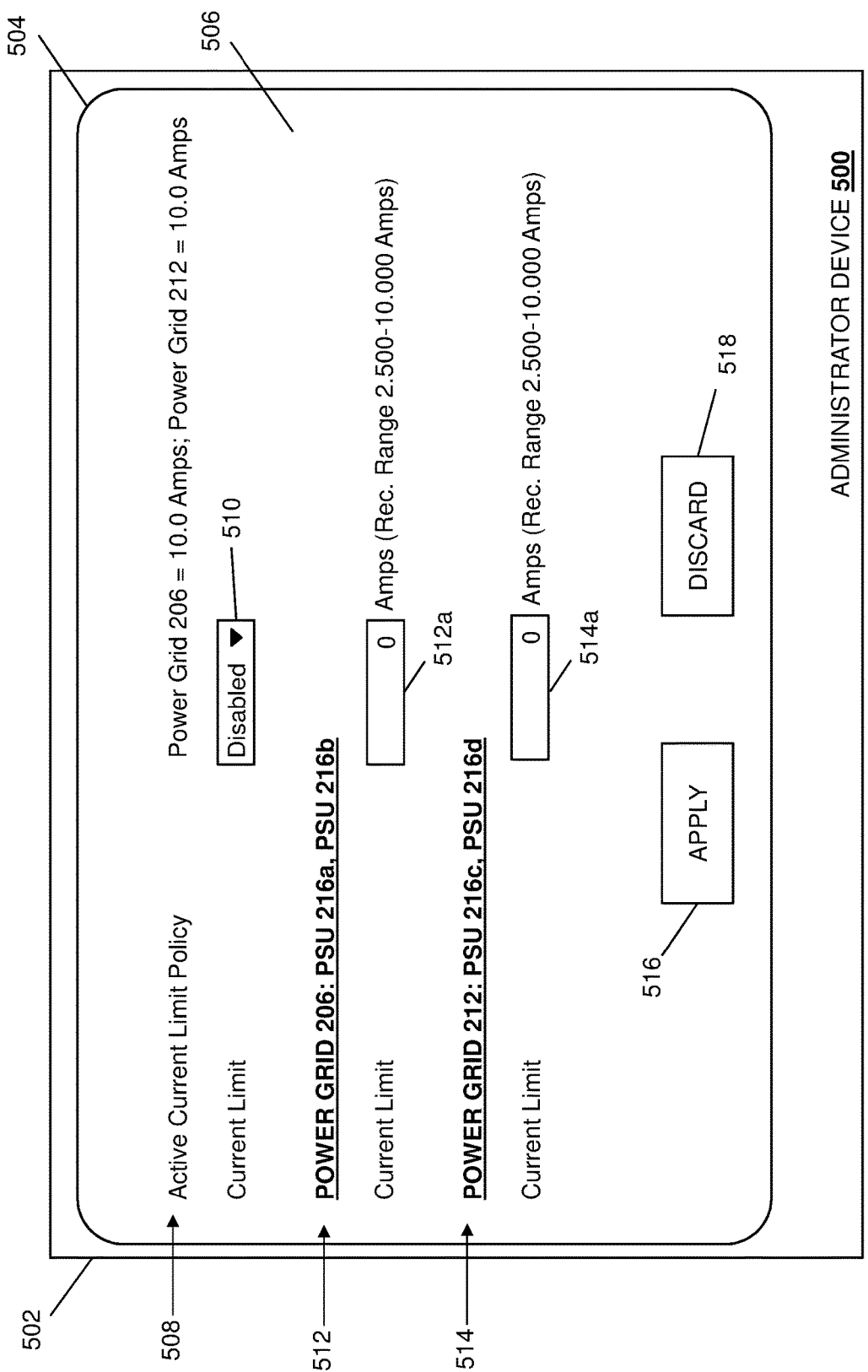
FIG. 5A is a screen shot illustrating an embodiment of a graphical user interface for setting a power management policy.
Figure 6:
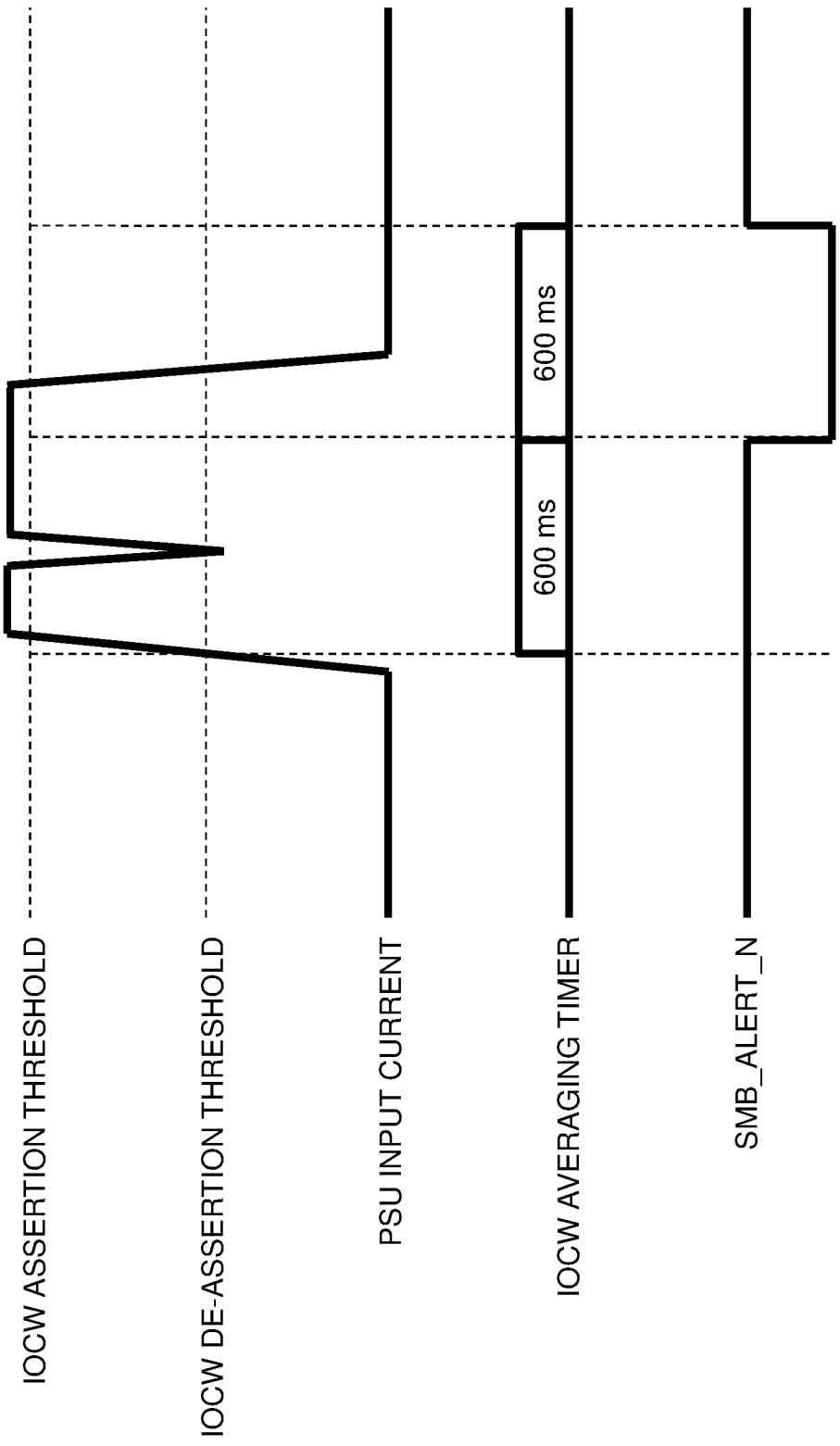
FIG. 6 is a chart illustrating an embodiment of power supply unit IOCW behavior and timing utilized by a hardware backup subsystem in the power management system of FIG. 2.

With reference to FIG. 5A, a power-grid-redundant graphical user interface 506 is illustrated as being displayed on the display subsystem 504 of the administrator device 500. For example, with reference to the server device 300 illustrated in FIG. 3, the power controller 308a provided by the system management firmware 308 included in the power management subsystem 306 may operate at block 402 to provide, via the communication system 316 and through the network 318 to the administrator device 320, information that is utilized by the administrator device 320 to display the power-grid-redundant graphical user interface 506. As such, any of the server devices 216, 218, and up to 220 may operate to provide a power-grid-redundant graphical user interface similar to the power-grid-redundant graphical user interface 506 illustrated in FIG. 5A for display on the administrator device 320 in response to, for example, a request by the administrator device 320 to provide or modify a power management policy for that server device.

As discussed below, the power-grid-redundant graphical user interface 506 may be displayed when the administrator device 500 is being used to provide a power management policy/input current limit policy for a server device (e.g., any of the server devices 216-220 in FIG. 2) that is coupled to multiple power grids (e.g., the power grids 206 and 212) in a "power-grid-redundant configuration". As would be understood by one of skill in the art in possession of the present disclosure, a server device may be coupled to multiple power grids in a power-grid-redundant configuration when the power supply units in that server device are sufficient to provide the server components in the server device with redundant power (i.e., a first subset of power supply units coupled to a first power grid are available to provide a power amount to the server device that is sufficient to allow a desired operating level for that server device, and a second subset of power supply units coupled to a second power grid are available to provide the power amount to the server device that is sufficient to allow the desired operating level for that server device in the event that the first subset of power supply units and/or their first power grid become unavailable.) As such, the server device 216 may be in a power-grid-redundant configuration when the power supply units 216a and 216b coupled to the power grid 206 via the circuit breaker 208 provide sufficient power to the server device 216 to allow for a desired operating level, and the power supply units 216c and 216d coupled to the power grid 212 via the circuit breaker 214 provide sufficient power to the server device 216 to allow for the desired operating level in the event the power supply units 216a and 216b and/or their power grid 206 become unavailable. One of skill in the art in possession of the present disclosure will recognize that the server devices 218 and 220 may be in a power-grid-redundant configuration based on their power supply units 218a-d and 220a-d, respectively, coupled to the power grids 206 and 212 in a similar manner as described above for the server device 216.

The power-grid-redundant graphical user interface 506 allows the administrator or other user to enable separate input current limits for each of the multiple power grids coupled to a server device, which may be based on the size of the respective circuit breakers 208 and 214 that couple the respective PDUs 204 and 210 to the respective power grids 206 and 212. In the embodiment illustrated in FIG. 5A, the power-grid-redundant graphical user interface 506 is provided to configure the power management policy/input current limit policy for the server device 216 in the power-grid-redundant configuration discussed above. As such, the power-grid-redundant graphical user interface 506 identifies an active current limit policy 508 that, in the illustrated example, limits the input current drawn from the power grid 206 and through the circuit breaker 208 to 10.0 amps, and limits the input current drawn from the power grid 212 and through the circuit breaker 214 to 10.0 amps. In addition, the power-grid-redundant graphical user interface 506 includes an input current limit activation box 510 that, in the illustrated embodiment, is set to "disabled", but which may be configured to provide a "drop-down" menu that allows the setting of "enable", "set—automatic", "set—manual", and/or any other power management policy setting that would be apparent to one of skill in the art in possession of the present disclosure. As such, with the input current limit activation box 510 set to "disabled" as illustrated, the input current limits of the present disclosure may not be applied to the server device 216, while if the input current limit activation box 510 is set to "enabled", the active current limit policy 508 (e.g., which limits the input current drawn from the power grid 206 and through the circuit breaker 208 to 10.0 amps, and limits the input current drawn from the power grid 212 and through the circuit breaker 214 to 10.0 amps) may be enabled and applied to the server device 216.

The power-grid-redundant graphical user interface 506 also identifies a first power grid section 512 that, in the illustrated embodiment, identifies the power grid 206 and the power supply units 216a and 216b in the server device 216 that are coupled to the power grid 206, as well as an input current limit box 512a that allows the administrator or other user to provide an input current limit that will operate to limit the input current drawn from the power grid 206 and through the circuit breaker 208 by the power supply units 216a and 216b. Similarly, the power-grid-redundant graphical user interface 506 identifies a second power grid section 514 that, in the illustrated embodiment, identifies the power grid 212 and the power supply units 216c and 216d in the server device 216 that are coupled to the power grid 212, as well as an input current limit box 514a that allows the administrator or other user to provide an input current limit that will operate to limit the input current drawn from the power grid 212 and through the circuit breaker 214 by the power supply units 216c and 216c. In the illustrated embodiment, the power-grid-redundant graphical user interface 506 identifies recommended input current limit ranges adjacent each of the input current limit boxes 512a and 514a (e.g., 2.500-10.000 amps). Finally, the power-grid-redundant graphical user interface 506 includes an apply button 516 and a discard button 518 that the administrator or other user may select to apply (or discard) any power management policy/input current limit defined using the power-grid-redundant graphical user interface 506.

In an embodiment, the setting of the input current limit activation box 510 to "set—automatic" may provide an instruction to the power controller 308a to automatically determine the input current limits that are associated with the power grids 206 and 212 and that are based on their associated current breakers 208 and 214, respectively. For example, in response to the administrator or other user setting the input current limit activation box 510 to "set—automatic", the power controller 308a may automatically determine, set, and display (e.g., via the input current limit boxes 512a and 514a) the input current limits associated with each of the power grids 206 and 212 based on, for example, the server device power budget for the server device 216, the maximum sustained workload for the server device 216, and/or any other information that would be apparent to one of skill in the art in possession of the present disclosure. Furthermore, in some examples, the "set—automatic" option for the input current limit activation box 510 may be expanded to address multiple operations based on a plurality of pre-characterized workloads that are to-be provided on the server device 216.

In another embodiment, the setting of the input current limit activation box 510 to "set—manual" may allow the administrator or other user to provide instructions to the power controller 308a to set the input current limits that are associated with the power grids 206 and 212 and that are based on their associated current breakers 208 and 214, respectively. For example, in response to the administrator or other user setting the input current limit activation box 510 to "set—manual", the administrator or other user may provide values in the input current limit boxes 512a and 514a to set the input current limits associated with each of the power grids 206 and 212 based on, for example, the capabilities of the power grids 206 and 212, the size of the circuit breakers 208 and 214, and/or any other information that would be apparent to one of skill in the art in possession of the present disclosure. In particular embodiments, the input current limits provided in the input current limit boxes 512a and 514a may be different (e.g., 5.0 amps and 10.0 amps, respectively) based on, for example, the different sizes of the circuit breakers 208 and 214, respectively, the different capabilities of the power grids 206 and 212, etc. While the provisioning of input current limits for a pair of power grids (i.e., the power grids 206 and 212) that is based on the sizes of their respective circuit breakers (i.e., the circuit breakers 208 and 214) has been described, one of skill in the art in possession of the present disclosure will recognize that input current limits associated with additional power grids and their respective circuit breakers will fall within the scope of the present disclosure as well.

Figure 5B:
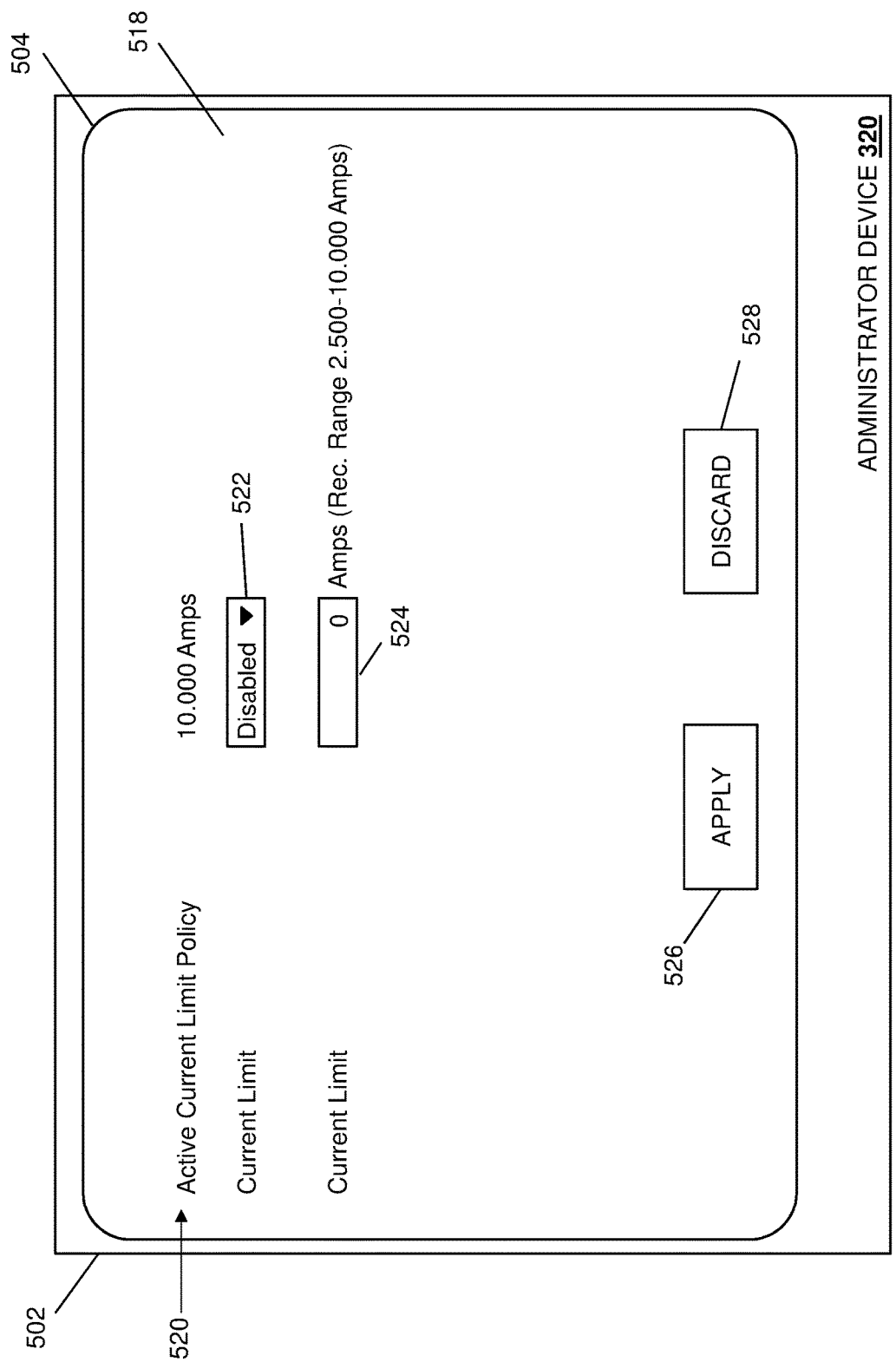
FIG. 5B is a screen shot illustrating an embodiment of a graphical user interface for setting a power management policy.

With reference to FIG. 5B, a non-power-grid-redundant graphical user interface 518 is illustrated as being displayed on the display subsystem 504 of the administrator device 500. For example, with reference to the server device 300 illustrated in FIG. 3, the power controller 308a provided by the system management firmware 308 included in the power management subsystem 306 may operate at block 402 to provide, via the communication system 316 and through the network 318 to the administrator device 320, information that is utilized by the administrator device 320 to display the non-power-grid-redundant graphical user interface 518. As such, any of the server devices 216, 218, and up to 220 may operate to provide a non-power-grid-redundant graphical user interface similar to the non-power-grid-redundant graphical user interface illustrated in FIG. 5B for display on the administrator device 320 in response to, for example, a request by the administrator device 320 to provide or modify a power management policy for that server device.

As discussed below, the non-power-grid-redundant graphical user interface 518 may be displayed when the administrator device 500 is being used to provide a power management policy/input current limit policy for a server device (e.g., any of the server devices 216-220 in FIG. 2) that is coupled to one or more power grids (e.g., the power grids 206 and/or 212) in a "non-power-grid-redundant configuration". As would be understood by one of skill in the art in possession of the present disclosure, a server device may be coupled to one or more power grids in a non-power-grid-redundant configuration when the power supply units in that server device are not sufficient to provide the server components in the server device with redundant power (i.e., the power supply units include a first subset of power supply units that are coupled to the power grid(s) and that are available to provide a power amount to the server device that is sufficient to allow a desired operating level for that server device, but do not include a second subset of power supply units that are available to provide the power amount to the server device that is sufficient to allow the desired operating level for that server device in the event that the first subset of power supply units and/or a power grid become unavailable.)

As such, the server device 216 may be in a non-power-grid-redundant configuration when the power supply units 216a, 216b, 216c, and/or 216d coupled to the power grids 206 and 208 via the circuit breakers 208 and 214 provide sufficient power to the server device 216 to allow for a desired operating level (e.g., the power supply units 216a-c may be utilized to provide that sufficient power), but do not include power supply units that can provide sufficient power to the server device 216 to allow for the desired operating level in the event the power supply units 216a, 216b, 216c, and/or 216d and/or their power grids 206 and 212 become unavailable (e.g., the power supply unit 216d cannot provide sufficient power in the event the power supply units 216a-c become unavailable). One of skill in the art in possession of the present disclosure will recognize that the server devices 218 and 220 may be in a non-power-grid-redundant configuration based on the power supply units 218a-d and 220a-d, respectively, coupled to the power grids 206 and/or 212 in a similar manner as described above for the server device 216.

The non-power-grid-redundant graphical user interface 518 allows the administrator or other user to enable a single input current limit for the multiple power grids coupled to a server device (or for a single power grid coupled to the server device, not illustrated). In the embodiment illustrated in FIG. 5B, the non-power-grid-redundant graphical user interface 518 is provided to configure the power management policy/input current limit policy for the server device 216 in the non-power-grid-redundant configuration discussed above. As such, the non-power-grid-redundant graphical user interface 518 identifies an active current limit policy 520 that, in the illustrated example, limits the input current drawn from the power grids 206 and 212 and through their respective circuit breakers 208 and 214 to 10.000 amps. In addition, the non-power-grid-redundant graphical user interface 518 includes an input current limit activation box 522 that in the illustrated embodiment is set to "disabled", but which may be configured to provide a "drop-down" menu that allows the setting of "enable", "set—automatic", "set—manual", and/or any other power management policy setting that would be apparent to one of skill in the art in possession of the present disclosure. As such, with the input current limit activation box 522 set to "disabled" as illustrated, the input current limits of the present disclosure may not be applied to the server device 216, while if the input current limit activation box 522 is set to "enabled", the active current limit policy 520 (e.g., which limits the input current drawn from the power grids 206 and 212 and through their respective circuit breakers 208 and 214 to 10.0 amps) may be enabled and applied to the server device 216.

The non-power-grid-redundant graphical user interface 518 also includes an input current limit box 524 that allows the administrator or other user to provide an input current limit that will operate to limit the input current drawn from the power grids 206 and 212 and through their respective circuit breakers 208 and 214 by the power supply units 216a-216d. In the illustrated embodiment, the non-power-grid-redundant graphical user interface 518 identifies a recommended input current limit range adjacent the input current limit box 524 (e.g., 2.500-10.000 amps). Finally, the non-power-grid-redundant graphical user interface 518 includes an apply button 526 and a discard button 528 that the administrator or other user may select to apply (or discard) any power management policy/input current limit defined using the non-power-grid-redundant graphical user interface 518.

In an embodiment, the setting of the input current limit activation box 522 to "set—automatic" may provide an instruction to the power controller 308a to automatically determine the input current limit that is associated with the power grids 206 and 212 and that are based on their associated current breakers 208 and 214, respectively. For example, in response to the administrator or other user setting the input current limit activation box 522 to "set—automatic", the power controller 308a may automatically determine, set, and display (e.g., via the input current limit box 524) the input current limit associated with each of the power grids 206 and 212 based on, for example, the server device power budget for the server device 216, the maximum sustained workload for the server device 216, and/or any other information that would be apparent to one of skill in the art in possession of the present disclosure. Furthermore, in some examples, the "set—automatic" option for the input current limit activation box 522 may be expanded to address multiple operations based on a plurality of pre-characterized workloads that are to-be provided on the server device 216.

In another embodiment, the setting of the input current limit activation box 522 to "set—manual" may allow the administrator or other user to provide instructions to the power controller 308a to set the input current limit that is associated with the power grids 206 and 212 and that are based on their associated current breakers 208 and 214, respectively. For example, in response to the administrator or other user setting the input current limit activation box 522 to "set—manual", the administrator or other user may provide a value in the input current limit box 524 to set the input current limit associated with each of the power grids 206 and 212 based on, for example, the capabilities of the power grids 206 and 212, the size of the circuit breakers 208 and 214, and/or any other information that would be apparent to one of skill in the art in possession of the present disclosure. While a variety of specific examples of the power management subsystem identifying input current limit polic(ies) for a server device have been illustrated and described, one of skill in the art in possession of the present disclosure will recognize that the input current limit policies may be identified in a variety of manner that will remain within the scope of the present disclosure.

The first pseudo code below provides a specific example of how an input current limit may be determined for one or more power grids by any particular server device:

```
// Initialization - Determine which PSU(s) are associated with each input line
If ( CurrentCapPolicyEnable ) {
  If ( !GridRedundantCfg ) { // single grid or input line
    For each installed PSU {
      PsuConvertedInputCurrent[i] = PsuOutputPower[i] / PsuEfficiency[i] /
        LineInputVoltage
    }
    PsuConvertedInputCurrent = sum ( all PsuConvertedInputCurrent[i] )
    PsuInputCurrent = sum( all installed PSUs input current )
    DerivedPsuInputCurrent = max( PsuInputCurrent, PsuConvertedInputCurrent )
    OverLimit = max (0,
    ( DerivedPsuInputCurrent - CurrentLimit )*
    PsuInputVoltage * Psu Efficiency ) // in Watts
  } else // grid redundant config
    HighestOverCurrent = 0 // initialize
    for each grid { // Index i
      for each installed PSU within grid {// Index j
        PsuConvertedInputCurrent[j] = PsuOutputPower[j] /
        PsuEfficiency[j] / GridInputVoltage[i]
      }
      Grid ConvertedInputCurrent[i] = sum ( all PsuConvertedInputCurrent[j] )
      GridInputCurrent[i] = sum ( all installed PSUs input current on this grid )
      DerivedGridInputCurrent[i] = max( GridInputCurrent[i],
      GridConvertedInputCurrent[i] )
      // CurrentLimit[i] is per grid
      If( HighestOverCurrent < ( DerivedGridInputCurrent[i] - CurrentLimit[i] )){
        HighestOverCurrent = ( DerivedGridInputCurrent[i] -
        CurrentLimit[i] )
        HighestGrid = j
      }
    }
    // NumActivePsu is total number of currently active PSUs
    // NumActivePsuInGrid[ ] is total within each grid
    OverLimit = max( 0, HighestOverCurrent *
    ( NumActivePsu / NumActivePsuInGrid[ HighestGrid ] )*
    GridInputVoltage[ HighestGrid ]* PsuEfficiency * VrEfficiency ) // in Watts
  }
}
```

While one of skill in the art in possession of the present disclosure will recognize that the first pseudo code above provides a specific example of code that is written as a single input current limit policy, but that code providing multiple, separate input current limit policies will fall within the scope of the present disclosure as well (e.g., one for each power grid, and each with its own current limit).

As discussed below, the power controller 308a may operate to determine whether to throttle its server device based on a total power supply unit input current draw for each power grid coupled to that server device—if the total input current exceeds the input current limit (e.g., "Over-Limit" in the first pseudo code above), the power controller 308a will throttle one or more of the server components 310. In some embodiments, due to stored energy in the power supply units, there may be a lag from when the server device load is seen at a power supply unit output (i.e., the output of the power supply unit to the server components 310/power controller 308a) until it is seen at the power supply unit input (i.e., the input to the power supply unit from the power distribution unit/power grid). As such, to avoid tripping the circuit breaker provided for the power grid, the power controller 308a may monitor the output of the power supply units, and convert that output via calculation to determine the input current draw of those power supply units, and then throttle based on the larger of the converted input current draws and the actual input current draws (as identified in the first pseudo code above).

As illustrated in FIGS. 5A and 5B, graphical user interfaces may be provided to assist administrators or other users in determining the appropriate input current limits for the power management system 200 by providing recommended input current ranges that may be determined based on, for example, valid power supply unit Over Current Warning (OCW) ranges, system worst-case max-throttled power budgets (e.g., via Node manager Lower Boundary (NLB)), and system maximum sustained power budgets (e.g., based on thermal limits via Thermal Design Power (TDP)). In a specific example, given the NLB and TDP discussed above, second pseudo code for determining recommended input current limit ranges may include:

```
// PsuInputOCWMin = minimum of PSU input OCW supported range
// PsuInputOCWMax = maximum of PSU input OCW supported range
// SystemNLBAsInputCurrent = system NLB budget converted to PSU input current
// SystemTDPAsInputCurrent = system TDP budget converted to PSU input current
If( !GridRedundantCfg ) {
  UserCurretnCapMin = 0 // initialize
  UserCurrentCapMax = 0 // inititalize
  for each good PSU {
    UserCurrentCapMin = UserCurrentCapMin + PsuInputOCWMin[i]
    UserCurrentCapMax = UserCurrentCapMax + PsuInputOCWMax[i]
  }
```

```
    UserCurrentCapMin = max( UserCurrentCapMin, SystemNLBAsInputCurrent )
    UserCurrentCapMax = min( UserCurrentCapMax, SystemTDPAsInputCurrent )
} else { // GridRedundantCfg
    If( (1+1) Grid Redundant) {
        For each grid { // Index i
            UserCurrentCapMin[i] = max( PsuInputOCWMin,
            SystemNLBAsInputCurrent )
            UserCurrentCapMax[i] = min( PsuInputOCWMax,
            SystemTDPAsInputCurrent )
        }
    } else { // >(1+1) grid redundant
        For each grid {// Inex i
            UserCurrentCapMax[i] = 0 // initialize
            for each installed PSU within grid { // Index j
                UserCurrentCapMax[i] = UserCurrentCapMax[i] +
                PsuInputOXWMax[j]
            }
            If ( (UserCurrentCapMax[i] / 2 ) > UserDefinedCurrentLiit[i] ) {
                Suggest to use to remove extraneous PSUs or turn them
                (cold-sparing)
            }
            UserCurretnCapMin[i] = max( (UserCurrentCapMax[i] / 2),
            SystemNLBAsInputCurrent )
            UserCurrentCapMax[i] = min( UserCurretnCapMax[i],
            SystemTDPAsInputCurrent )
        }
    }
}
```

As discussed below, on subsequent iterations of the method 400, block 402 may be followed by optional block 404 where the power management subsystem adjusts input current limit(s) in order to reduce the amount of power being stranded by the server devices. However, on the initial iteration of the method 400, optional block 404 may be skipped. As such, on the initial iteration of the method 400, block 402 is followed by block 406 where the power management subsystem monitors one or more input current draws of respective power supply unit(s). In an embodiment, at block 406, the power controller 308a provided by the system management firmware 308 included in the power management subsystem 306 operates to monitor the input current draw of the power supply units 304a, 304b, 304c, and 304d.

The method 400 then proceeds to decision block 408 where it is determined whether active throttling is being performed to reduce input current. In an embodiment, at decision block 408, the power controller 308a provided by the system management firmware 308 included in the power management subsystem 306 operates to determine whether the power management subsystem 306 is operating to actively throttle any of the server components 310 in order to reduce the amount of input current being drawn by those server components from the PSUs 304a, 304b, 304c, and/or 304d. For example, the power controller 308a may monitor processing systems, memory systems, and/or any of the other server components 310 in order to determine whether those server component(s) 310 are being actively throttled to reduce the input current draw on the PSUs 304a-304c in the server device 300. If, at decision block 408, it is determined that at least one of the server components 310 is being actively throttled to reduce the input current draw on the PSUs 304a-304c, the method 400 may proceed to block 410 where the power management subsystem 308 adjusts server component power limits to optimize performance. In an embodiment, at block 410, the power controller 308a provided by the system management firmware 308 included in the power management subsystem 306 may operate to adjust the power limits of any of the server component(s) 310 in order to optimize their performance (e.g., based on the active throttling of those or other server components 310). For example, at block 410, the power controller 308a may operate to adjust the power limits of a processing system in the server device 300 based on the active throttling of that processing system.

If, at decision block 408, it is determined that none of the server components 310 is being actively throttled to reduce the input current draw on the PSUs 304a-304c, the method 400 then proceeds to decision block 412 where it is determined whether the input current draw(s) of the power supply unit(s) exceed input current limit(s). In an embodiment, at decision block 412, the power controller 308a provided by the system management firmware 308 included in the power management subsystem 306 operates to determine whether the input current draw of the power supply units 304a, 304b, 304c, and 304d exceeds the input current limit(s) identified at block 402. For example, at decision block 412 and in embodiments in which the server device 216 is in the power-grid-redundant configuration, the power controller 308a in the server device 300/216 may determine whether the input current draw of the power supply units 216a and 216b exceed the input current limit set for the power grid 206/circuit breaker 208, and whether the input current draw of the power supply units 216c and 216d exceed the input current limit set for the power grid 212/circuit breaker 214. In another example, at decision block 412 and in embodiments in which the server device 216 is in the non-power-grid-redundant configuration, the power controller 308a in the server device 300/216 may determine whether the input current draw of the power supply units 216a, 216b, 216c, and/or 216b exceeds the input current limit set for the power grids 206 and 212/circuit breakers 208 and 214.

If, at decision block 412, it is determined that the input current draw(s) of the power supply unit(s) do not exceed input current limit(s), the method 400 returns to block 402 where the power management subsystem may identify new input current limit polic(ies), and/or continue to monitor the input current draw(s) of the power supply unit(s). As such, following the identification of the input current limit polic(ies) at block 402, the method 400 may loop through blocks 402 and 404 and decision block 406 to update any input current limit policies (if available), and monitor the input current draw(s) of the power supply unit(s) as long as the input current draw(s) of the power supply unit(s) do not exceed the input current limit(s).

If, at decision block 412, it is determined that the input current draw(s) of the power supply unit(s) exceed input current limit(s), the method 400 proceeds to block 414 where the power management subsystem throttles component(s) to reduce the input current draw(s) of the power supply unit(s) below the input current limit(s). In an embodiment, at block 414, the power controller 308a provided by the system management firmware 308 included in the power management subsystem 306 operates to throttle one or more of the server components 310 to reduce the input current draws of the power supply units 304a, 304b, 304c, and/or 304d below the input current limits. For example, at block 414 and in embodiments in which the server device 216 is in the power-grid-redundant configuration, the power controller 308a in the server device 300/216 may throttle one or more of the server components 310 to reduce the input current draw of the power supply units 216a and 216b below the input current limit set for the power grid 206/circuit breaker 208, and reduce the input current draw of the power supply units 216c and 216d below the input current limit set for the power grid 212/circuit breaker 214. In another example, at block 414 and in embodiments in which the server device 216 is in the non-power-grid-redundant configuration, the power controller 308a in the server device 300/216 may operate to reduce the input current draw of the power supply units 216a, 216b, 216c, and/or 216b below the input current limit set for the power grids 206 and 212/circuit breakers 208 and 214.

In examples in which a server device is in the power-grid-redundant configuration discussed above, the amount to throttle the server component(s) 310 may be based on the highest "OverLimit" of the power grids (as detailed in the first pseudo code above), and may also be multiplied by the ratio of the number of total active power supply units to the total number of active power supply units within a power grid. This allows for power supply unit failure when more than two power supply units are involved. For example, consider a Central Processing Unit (CPU) as the server component 310 that is throttled at block 410, with the server device 216 of FIG. 2 in a power-grid-redundant configuration with the power supply units 216a and 216b coupled to the power grid 206, and the power supply units 216c and 216d coupled to the power grid 212. If the power supply unit 216d becomes unavailable, power grid redundancy will be lost, with the power grid 206 coupled to active power supply units 216a and 216b, and the power grid 212 coupled to the active power supply unit 216c and the unavailable power supply unit 216d.

In the event power grid 206 is determined to have the highest amount of current to reduce, in order to effectively lower the current drawn from the power grid 206 and through the circuit breaker 208 by 1 amp, the amount of CPU power to reduce is multiplied by the number of total active power supply units (3—the power supply units 216a, 216b, and 216) divided by the total number of active power supply units within the grid (2—the power supply units 216a and 216b), and the amount of CPU power will be reduced by a multiple of 1.5 (i.e., 1.5 amps). Similarly, in the event power grid 212 is determined to have the highest amount of current to reduce, in order to effectively lower the current drawn from the power grid 212 through the circuit breaker 314 by 1 amp, the amount of CPU power to reduce is multiplied by the number of total active power supply units (3—the power supply units 216a, 216b, and 216c) divided by the total number of active power supply units within the grid (1—the power supply unit 216c), and the amount of CPU power will be reduced by a multiple of 3 (i.e., 3 amps).

In another example, consider a CPU as the server component 310 that is throttled at block 410, with the server device 216 of FIG. 2 in a power-grid-redundant configuration with the power supply units 216a and 216b coupled to the power grid 206, and the power supply units 216c and 216d coupled to the power grid 212. If the power grid 212 becomes unavailable, power grid redundancy will be lost, with the power grid 206 coupled to active power supply units 216a and 216b, and the power supply units 216c and 216d coupled to the unavailable power grid 212. In order to effectively lower the current drawn from the power grid 206 and through the circuit breaker 208 by 1 amp, the amount of CPU power to reduce is multiplied by the number of total active power supply units (2—the power supply units 216a and 216b,) divided by the total number of active power supply units within the grid (2—the power supply units 216a and 216b), and the amount of CPU power will be reduced by a multiple of 1 (i.e., 1 amp).

Furthermore, as detailed in the first pseudo code above, with system throttling typically performed at the CPUs via CPU power limiting, "OverLimit" may be converted to power to reduce in watts, with the inclusion of PSU and VR efficiency where appropriate/needed. As would be understood by one of skill in the art in possession of the present disclosure, various algorithms exist to manage system power by managing subsystem power, and those algorithms may be implemented while remaining within the scope of the present disclosure.

The method 400 may then proceed to block 410 where the power management system adjusts server component power limits to optimize performance in substantially the same manner as described above, and then may begin subsequent iterations in which block 410 is followed by block 402 where the power management subsystem may operate to again identify input current limit polic(ies). In an embodiment, following the throttling of component(s) at block 414 to reduce input current draw(s) of power supply unit(s) below the input current limit(s) and the adjustment of server component power limits to optimize performance at block 410, at blocks 402 and 404, the power controller 308 may operates to re-determine/adjust the input current limit(s) to reduce a current draw difference between the input current limit(s) and a throttled current draw that results when the at least one server component is throttled. For example, the power controller may periodically determine "OverLimit" (described in the first pseudo code above), and then apply needed system throttling to get the input current draw just below that input current limit, and once the total input current draw of the power supply units is below the input current limit, server components will be throttled at a level such that the current draw difference between the input current limit(s) and a throttled current draw stays just below the input current limits (with care to avoid exceeding those input current limits with added hysteresis).

For example, in a non-power-grid-redundant configuration, the current draw difference ("RaiseLimit") may be reduced via the third pseudo code below:

```
RaiseLimit = min( 0,
    (( CurrentLimit - DerivedPsuInputCurrent ) * PsuInputVoltage - Hysteresis ) * Psu
    Efficiency * VrEfficiency ) // in Watts
```

In another example, in a power-grid-redundant configuration, the current draw difference ("RaiseLimit") may be based on the minimum of the power grids ("LowestRaiseCurrent"), and may be determined by the fourth pseudo code below:

```
LowestRaiseCurrent = 0xFFFF // initialize to a large positive value for each grid { // index i
    // UserDefinedCurrentLimit[i] is per grid
    If( LowestRaiseCurrent > ( CurrentLimit[i] - DerivedGridInputCurrent[i] )) {
        LowestRaiseCurrent = ( CurrentLimit[i] - DerivedGridInputCurrent[i] )
        LowestGrid = i
    }
RaiseLimit = min( 0,
    ( LowestRaiseCurrent * ( NumActivePsu / NumActivePsuInGrid[ LowestGrid ] ) *
    GridInputVoltage[ LowestGrid ] - Hysteresis) * Psu Efficiency * VrEfficiency ) // in
    Watts
```

For the purposes of the discussion below, "hot sparing" may be utilized to refer to a power system feature in which PSUs connected to a redundant power grid are configured to be placed in a sleep state in order to consolidate the power load of their server device in the active PSUs in that server device. Such functionality may be activated in relatively light power load conditions in order to improve the operating efficiency of the PSUs, which reduces power consumption and associated operating costs. As such, the PSUs in the server device may go in and out of sleep states based on their load, which may be monitored by those PSUs internally. In some embodiments, hot sparing may be enabled for the power management subsystem 200 and configured to provide a backup power grid (e.g., the power grid 212) that does not provide power to the server devices 216-220 unless a primary power grid (e.g., the power grid 206) becomes unavailable. In such situations, during normal operation, the power controllers 308a in the power management subsystems 206 may only enforce the input current limit for the primary power grid 206, as no load will be measured for the backup power grid 212. However, when the primary power grid 206 becomes unavailable, hot sparing operations may be performed to "wake up" the backup power grid 212 to supply power to the server devices 216-220, and the power controllers 308a in the power management subsystems 206 would then enforce the input current limits on the backup power grid 212, as no load will be measured for the unavailable primary power grid 212.

In some embodiments, the power management system 200 may be expanded to support per-power-supply-unit input current limits rather than per-power-grid input current limits, which may be particularly beneficial to protect power input cords, power distribution unit plugs, and/or other power supply unit components that would be apparent to one of skill in the art in possession of the present disclosure. Furthermore, one of skill in the art in possession of the present disclosure will recognize that such embodiments may also be useful to provide a power supply unit fault tolerant redundant mode.

In some embodiments, datacenter-level management systems may be coupled to the power management system and configured to access the per-power-grid input current limits, sum those per-power-grid input current limits, and check those per-power-grid input current limit sums against the PDUs (e.g., the PDUs 204 and 206 in FIG. 2) as well as the sizes of the circuit breakers (e.g., the circuit breakers 208 and 214) in order to determine whether proper connections and/or configurations have been provided. Such functionality allows the datacenter-level management systems to alert an administrator or other user (e.g., of the administrator device 320) when the configuration of the power management system 200 is wrong, inefficient, and/or could otherwise be improved.

One of skill in the art in possession of the present disclosure will recognize how conventional power management systems may support multiple power limiting policies that are managed concurrently by the power management system, and that the input current limits/policies of the present disclosure may be managed concurrently with conventional power limiting policies to provide support for the new usage models described herein while maintaining support for existing/conventional usage models.

In some embodiments, the power controller 308a provided by the system management firmware 308 in the power management subsystem 306 may be offline, or unable to respond quickly enough to protect (e.g., avoid tripping) the circuit breakers that couple the power supply units to the power grids. In such situations, an input over-current warning may be provided by the power supply unit(s) to the hardware backup subsystem 314 that triggers hardware throttling by the hardware backup subsystem 314 on the server components 310, with the hardware backup subsystem 314 configured to take over for the power controller 308a with regard to the throttling of the server components 310 regardless of whether the power controller 308a knows it is about to go offline due to an impending reset (as is required in conventional system). As such, the power controller 308a provided by the system management firmware 308 may operate according to the method 300 to perform relatively small amounts of throttling to the server components 310 to enforce the input current limits while maximizing the performance of its server device, while the hardware backup subsystem 314 may be configured to perform relatively large amounts of throttling to ensure that the input current limits are not exceeded for any significant amount of time.

The functionality of the hardware backup subsystem 314 may be enabled via Input Over Current Warning (IOCW)_ protection in the power supply units with a configurable threshold and, in optional embodiments, configurable assertion/de-assertion trigger delays. For example, the power supply units in the server devices may operate to monitor their input currents and, if their input current limits are exceeded, assert an interrupt such as, an SMB_ALERT_N alert to their server device (which may be configured via SMBALERT_MASK). The hardware backup subsystem 314 (e.g., provided by CPLD) may receive the interrupt asserted by the power supply unit(s) and, in response, transmit throttling signal(s) to the server component(s) 310. When de-assertion is triggered, the power supply units may de-assert the SMB_ALERT_N alert to their server device (assuming no other power supply unit event/source needs to assert the SMB_ALERT_N alert).

In some embodiments, the power controller 308a provided by the system management firmware 308 may configure an Input Over-Current Warning (IOCW) threshold in the power supply units based on, for example, the user-defined (or automatically determined) per-power-grid input current limits discussed above. Furthermore, in embodiments in which assertion/de-assertion trigger delays are configurable, the power controller 308a provided by the system management firmware 308 may configure those as well. In embodiments in which the assertion/de-assertion trigger delays are configurable, an IOCW assertion trigger delay in the power supply units may be provided such that it lasts long enough to allows the system-management-firmware-based throttling (which limits the input current draw by power supply units) to operate when the power controller 308a is available, and short enough to still allow for throttling of the server components 310 by the hardware backup subsystem 314 in a time period that is sufficient to avoid tripping the circuit breakers 208 and 214. Additionally, the IOCW de-assertion trigger delay in the power supply units should be provided such that it lasts long enough to avoid tripping the circuit breakers due to repeated "hits" (i.e., where the power load resumes and exceeds that IOCW threshold repeatedly), which allows the circuit breakers 208 and 214 to cool off. One of skill in the art in possession of the present disclosure will recognize that, if the IOCW de-assertion trigger delay for the power supply units is not adequate, the associated negative implications may be remedied on the server device side via, for example, reduced throttling durations.

In an experimental embodiment, the design target for circuit breaker protection included ensuring "power excursions" (e.g., input current draws exceeding the input current limit(s)) were reduced below the input current limit within 1 second. In order to provide the power controller 308a sufficient time to respond to such power excursions (and time for that response to take effect), the power management subsystem 306 implemented an IOCW assertion trigger delay of 600 milliseconds, with the IOCW de-assertion trigger delay being at least 600 milliseconds or more. Referring now to FIG. 6, an embodiment of the power supply unit IOCW behavior and timing according to the experimental embodiment is illustrated. As can be seen, an advantage of using an averaging window (as opposed to checking for contiguous time above the IOCW assertion threshold) is that doing so allows the triggering of the SMB_ALERT_N alert even if the power load momentarily drops below the IOCW assertion threshold but averages above the IOCW assertion threshold, which avoids tripping the circuit breakers 208 and 214. However, while specific IOCW assertion/de-assertion trigger delays utilized in the experimental embodiment are illustrated, one of skill in the art in possession of the present disclosure will recognize that other IOCW assertion trigger delays and IOCW de-assertion trigger delays will fall within the scope of the present disclosure as well.

Once configured by the power controller 308a provided by the system management firmware 308, the IOCW mechanism in the power supply units (i.e., the IOCW threshold, IOCW assertion trigger delay, and IOCW de-assertion trigger delay, etc.) operates independently of the power controller 308a. As such, the IOCW mechanism in the power supply units may provide for the assertion of the power supply unit SMB_ALERT_N alert (when the IOCW threshold and IOCW assertion trigger delay are met) to initiate throttling of the server components 310 regardless of whether the power controller 308a provided by the system management firmware 308 is available. When configurable, the SMB_ALERT_N alert assertion based on the IOCW threshold is configured to be non-latching (i.e., it does not stay asserted until it is de-asserted), as no entity in the system is configured to clear the SMB_ALERT_N alert assertion when the power controller 308a is unavailable. Rather, the SMB_ALERT_N alert may de-assert when the IOCW de-assertion trigger delay is met, and one of skill in the art in possession of the present disclosure will recognize how hysteresis between the IOCW assertion and de-assertion thresholds can be enabled in the power management system 306 while remaining within the scope of the present disclosure.

In a specific embodiment, the Input Over Current Warnings (IOCWs) discussed above may be implemented in hardware in the PSUs. As such, if firmware in the server device fails to manage the power load of the server device, the PSU(s) may detect a current draw that exceeds a configured limit and respond by driving a discrete signal (e.g., SMBAlert #) to the server device that will initiate hardware based throttling controls. For example, the server device may be configured to assist a user in determining a valid current limit set point via the provisioning of guidance on valid current ranges and, in particular, valid current limit floors, which may be influenced by a dynamic power range of installed hardware that can be controlled by the power management system, a limited range of PSU OCW range sensors, etc.

The server devices will typically route SMB_ALERT_N alert assertions in order to assert CPU throttling (e.g., via CPU PROCHOT) to throttle CPU power to a minimum. However, the server devices may be configured to assert MEMHOT_N as well for memory bandwidth throttling, Peripheral Component Interconnect express (PCIe) POWER_BRAKE_N for PCIe throttling, and/or other hardware power controls in response to the assertion of SMB_ALERT_N alert. However, one of skill in the art in possession of the present disclosure will recognize that such throttling actions bring the performance of the server devices to a minimum, which is why the hardware backup subsystem 314 is provided as a backup solution to the firmware-based input current limit policies enforced by the power controller 308a provided in the system management firmware 308 as discussed above, which is capable of relatively "fine-grained" control that can keep the server devices operating just below the input current limits (instead of at the minimum operating level provided via throttling by the hardware backup subsystem 314), and thus operates to optimize the performance of the server devices in consideration of the input current limits that prevent tripping of the circuit breakers 208 and 214.

In embodiments in which multiple power supply units are provided in a server device (e.g., the power supply units 304a-d in the server device 300), those power supply units may be configured to share the system load, but one of skill in the art in possession of the present disclosure will recognize that the server device load will never be shared completely equally between each of those power supply units, which results in a power supply unit output current sharing error. In some examples, that power supply unit output current sharing error may be handled by the power management system 306. For example, the power controller 308a provided by the system management firmware 308 may add some margin ("PsuSharingMargin" in the fifth pseudo code provided below), and take that margin into account in configuring the power supply unit IOCW threshold in order to avoid unnecessary SMB_ALERT_N alert assertions. Due to the power supply unit output current sharing error, the administrator or other user may provide some margin between the aggregate input current limit for a power grid/circuit breaker, and the size of the circuit breaker, which one of skill in the art in possession of the present disclosure will recognize may result in some stranded power.

Furthermore, in configuring the power supply unit IOCW threshold, if the server devices and their power supply units support hot sparing (i.e., where a subset of the power supply units are put to "sleep" under relatively light power loads while another subset of the power supply units support the entire power load), the hot sparing switching regions may be handled, avoided, or made irrelevant based on the power supply unit "N+M" configuration. Setting the power supply unit IOCW threshold in the hot spare switching region may result in unnecessary SMB_ALERT_N alert assertions when the power supply units switch from sharing the power load to hot sparing (in which the power load is not shared as discussed above), resulting in a higher power load on the active power supply unit(s).

As such, in some examples, in non-power-grid-redundant configurations hot sparing may be disabled so that the hot sparing switching region does not apply. For example, in a "1+1" power-grid-redundant configuration (i.e., 1 primary power supply unit and 1 redundant power supply unit), the power supply unit IOCW threshold may be configured for failover, which inherently allows the hot spare switching region to be handled, as covering failover also covers situations in which one of the two available power supply units are put to "sleep". In a greater than "1+1" power-grid-redundant configuration, the power supply unit IOCW threshold may not be configured below 50% of power supply unit capacity in order to avoid the hot spare switching region (e.g., 20% to 50%). For example, in a "2+2" power-grid-redundant configuration (i.e., 2 primary power supply units and 2 redundant power supply units), if the administrator or other user-specified input current limit results in the power supply unit IOCW threshold being below 50% (i.e., "2+2" power supply units are installed, but limited to "1+1" power supply units (or less)), extraneous power supply units may be turned off to force the IOCW threshold of the remaining power supply units above 50%. Optionally, the system may recommend to the administrator or other user to reduce the number of installed power supply units in such a case. In situations in which the server devices or power supply units do not support hot sparing, the restrictions for the greater than "1+1" power-grid-redundant configurations discussed above may not apply.

As such, the IOCW threshold for power supply units may be configured according to the fifth pseudo code provided in the example below:

```
// NumActivePsu is total number of currently active PSUs
// NumActivePsuInGrid[ ] is total within each grid
// PsuSharingMargin = 2.5% of 100% max rated output current* converted to input current
// *regardless of line input level
// 2.5% adjustment to allow margin for output current sharing error of +/- 2% of 100% load
// PsuRatedOutputCurrent is input line independent and equivalent to 100% capacity
// PsuSharingMargin = 2.5% * (PsuRatedOutputCurrent * PsuOutputVoltage ) / PsuInputVoltage
// PsuInputOCWhalf is input current equivalent to 50% PSU output capacity
// PsuInputOCWhalf - 50% * (PsuRatedOutputCurrent * PsuOutput Voltage ) / PsuInputVoltage
if( CurrentCapPolicyEnable ) {
    if( !GridRedundantCfg ) {
        if( NumActivePsu == 1 )
            PsuInputOCW = CurrentLimit
        else // NumAcivePsu M 1
            for each installed active PSU {
                PsuInputOCW[i] = (CurrentLimit / NumActivePsu ) +
                PsuSharingMargin
            }
    } else { // GridRedundantCfg ) {
        if( (1+1) Grid Redundant) {
            for each grid { // Index i
                for each installed PSU { // Index j
                    PsuInputOCW[j] = CurrentLimit[i] + PsuSharingMargin
                }
            }
        } else { // >(1+1) grid redundant
            for each grid { // Index i
                for each installed active PSU within grid { // index j
                    // PsuInputOCWhalf is included here to avoid hat-spare region
                    // Also, for example, no sense in installing 2+2 and cap to 1+1 or less
                    PsuInputOCW[j] = max( PsuInputOCWhalf[j] +
                    PsuSharingMargin,
                        (CurrentLimit[i] / NumActivePsuInGrid[i] ) +
                    PSUSHaringMargin )
                }
            }
        }
    }
}
```

As would be understood by one of skill in the art in possession of the present disclosure, the fifth pseudo code provided above may have the IOCW threshold for the power supply units set to its minimum if the request is below the minimum, and set to its maximum if the request is above the maximum. Furthermore, the power controller 308a provided by the system management firmware 308 in the power management subsystem 206 may configured the IOCW threshold in the power supply units upon any of: a reset of the power controller 308a, a change to the input current limit by the administrator or other user, a hot-insertion or input power restore of a power supply unit, a failure of the power supply unit, and/or other situations that would be apparent to one of skill in the art in possession of the present disclosure.

In the event the input current limit policy is disabled, the power controller 308a provided by the system management firmware 308 in the power management subsystem 206 may revert the IOCW threshold for the power controller to a default (e.g., maximum) value, which may be enabled via the sixth pseudo code in the example below:

```
If( !CurrentCapPolicyEnable ) {
    // this needs to be done only once, so, use a flag to track if needed for each installed
    PSU {
        PsuInputOCW = PsuMaxInputOCW // reset to default (max)
    }
}
```

As such, specific embodiments of the systems and methods of the present disclosure may implement two primary power control loops: 1) A one-to-many power control loop that may be implemented by a systems management console (e.g., the DELL® OpenManage Power Center (OMPC) available from DELL® Inc. of Round Rock, Tex., United States) that may receive server-rack-level power grid limits specified by a user, and then monitor server device power loads on a per-power-grid basis in order to assign each power grid per-server power limits, which operates as a dynamic power control loop that prevents power from being allocated to server devices that are not actively using it, and 2) a server-level power control loop that may be implemented by the power management subsystem 306 that may respond to dynamic power limit updates to current limit policies from the OMPC, with the power management subsystem 306 dynamically monitoring per-power-grid power loads from the server devices and, in turn, dynamically adjusting power limits to server components that support power limiting, providing a dynamic power control loop that prevents power from being allocated to server components that are not actively using it. One of skill in the art in possession of the present disclosure will recognize how such power control loops may greatly reduce the amount of stranded power in such systems.

Thus, systems and methods have been described that provide a firmware-based power controller that executes firmware-based power controller policies that allow the input current draw of power supply unit(s) in a server/system from the power grid to which they are coupled to be limited based on the respective circuit breaker through which they are coupled to that power grid, which allows those circuit breaker(s) to be sized for failover according to a total input current limit. Furthermore, when the server/system includes different power supply units that are coupled to different power grids, the firmware-based power controller policies allow for different input current limits for power supply unit(s) in the server/system coupled to different power grid that may be based on the different sized circuit breaker used to couple the power supply units to those different power grids. Finally, a hardware-based subsystem may be provided to trigger server/system throttling when the firmware-based power controller is unavailable or unable to respond quickly enough, and may be configured to take over for the firmware-based power controller regardless of whether the firmware-based power controller is aware it is about to go offline due to a coming server/system reset. As such, the firmware-based power controller operates to provide "fine-grained" throttling of server/system components based on a configurable input current limit applied to power supply units in order to avoid tripping of circuit breakers, while a hardware backup subsystem is configured to throttle the server/system components to a minimum operating level to ensure that those input current limits are not exceeded to a point that trips those circuit breakers.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power management system, comprising:
  a first power source coupled to a first over-current protection subsystem;
  a second power source coupled to a second over-current protection subsystem;
  a first power distribution subsystem coupled to the first over-current protection subsystem;
  a second power distribution subsystem coupled to the second over-current protection subsystem; and
  a computing device including:
    at least one computing component;
    at least one first power conversion device coupled to the first power distribution subsystem; and
    at least one second power conversion device coupled to the second power distribution subsystem;
    a power management subsystem coupled to the at least one computing component, the at least one first power conversion device, and the at least one second power conversion device, wherein the power management subsystem is configured to:
      monitor a first input current draw of each of the at least one first power conversion device;
      monitor a second input current draw of each of the at least one second power conversion device;
      determine whether a sum of the first input current draw and the second input current draw exceeds a first/second input current limit that is based on the first over-current protection subsystem and the second over-current protection subsystem; and
      throttle, in response to the sum of the first input current draw and the second input current draw exceeding the first/second input current limit, the at least one computing component to:
lower the sum of the first input current draw and the second input current draw below the first/second input current limit; and
reduce a first/second current draw difference between 1) the sum of the first input current draw and the second input current draw, and 2) the first/second input current limit such that stranded power on the at least one first power conversion device and the at least one second power conversion device is reduced.

2. The system of claim 1,
wherein the power management subsystem is configured to:
determine whether the first input current draw exceeds a first input current limit that is based on the first over-current protection subsystem; and
throttle, in response to the first input current draw exceeding the first input current limit, the at least one computing component to:
lower the first input current draw below the first input current limit; and
reduce a first current draw difference between the first input current draw and the first input current limit such that stranded power on the at least one first power conversion device is reduced.

3. The system of claim 1,
wherein the power management subsystem is configured to:
determine whether the second input current draw exceeds a second input current limit that is based on the second over-current protection subsystem; and
throttle, in response the second input current draw exceeding the second input current limit, the at least one computing component to:
lower the second input current draw below the second input current limit; and
reduce a second current draw difference between the second input current draw and the second input current limit such that stranded power on the at least one second power conversion device is reduced.

4. The system of claim 1, wherein the computing device includes:
a communication system that is coupled to a network and the power management subsystem, wherein the power management subsystem is configured to:
receive, through the network via the communication system from an administrator device, the first/second input current limit.

5. The system of claim 1, wherein the power management subsystem is configured to:
retrieve a computing device power budget for the computing device; and
automatically determine, using the computing device power budget, the first/second input current limit.

6. The system of claim 1, wherein the power management subsystem is configured to:
adjust the first/second input current limit to reduce the first/second current draw difference between 1) the sum of the first input current draw and the second input current draw and 2) the first/second input current limit.

7. An Information Handling System (IHS), comprising:
a processing system; and
a memory system that is coupled to the processing system and that includes instructions that, when executed by the processing system, cause the processing system to provide a power management subsystem that is configured to:
monitor a first input current draw of at least one first power conversion device that is coupled to a first power source via a first over-current protection subsystem;
monitor a second input current draw of at least one second power conversion device that is coupled to a second power source via a second over-current protection subsystem;
determine whether a sum of the first input current draw and the second input current draw exceeds a first/second input current limit that is based on the first over-current protection subsystem and the second over-current protection subsystem; and
throttle, in response the sum of the first input current draw and the second input current draw exceeding the first/second input current limit, the at least one system component to:
lower the sum of the first input current draw and the second input current draw below the first/second input current limit; and
reduce a first/second current draw difference between 1) the sum of the first input current draw and the second input current draw and 2) the first/second input current limit such that stranded power on the at least one first power conversion device and the at least one second power conversion device is reduced.

8. The IHS of claim 7, wherein the power management subsystem is configured to:
determine whether the first input current draw exceeds a first input current limit that is based on the first over-current protection subsystem; and
throttle, in response to the first input current draw exceeding the first input current limit, the at least one system component to:
lower the first input current draw below the first input current limit; and
reduce a first current draw difference between the first input current draw and the first input current limit such that stranded power on the at least one first power conversion device is reduced.

9. The IHS of claim 8, wherein the power management subsystem is configured to:
determine whether the second input current draw exceed a second input current limit that is based on the second over-protection subsystem; and
throttle, in response the second input current draw exceeding the second input current limit, the at least one system component to:
lower the second input current draw below the second input current limit; and
reduce a second current draw difference between the second input current draw and the second input current limit such that stranded power on the at least one second power conversion device is reduced.

10. The IHS of claim 9, wherein the second input current limit is different than the first input current limit.

11. The IHS of claim 7, wherein the power management subsystem is configured to:
receive, through a network from an administrator device, the first/second input current limit.

12. The IHS of claim 7, wherein the power management subsystem is configured to:
retrieve a system power budget; and
automatically determine, using the system power budget, the first/second input current limit.

13. The IHS of claim 7, wherein the power management subsystem is configured to:
adjust the first/second input current limit to reduce the first/second current draw difference between 1) the sum of the first input current draw and the second input current draw and 2) the first/second input current limit.

14. A method for power management, comprising:
monitoring, by a power management subsystem in a computing device, a first input current draw of at least one first power conversion device in the computing device that is coupled to a first power source via a first over-current protection subsystem;
monitoring, by the power management subsystem, a second input current draw of at least one second power conversion device that is coupled to a second power source via a second over-current protection subsystem;
determining, by the power management subsystem, whether a sum of the first input current draw and the second input current draw exceeds a first/second input current limit that is based on the first over-current protection subsystem and the second over-current protection subsystem; and
throttling, by the power management subsystem in response the sum of the first input current draw and the second input current draw exceeding the first/second input current limit, at least one computing component in the computing device to:
lower the sum of the first input current draw and the second input current draw below the first/second input current limit; and
reduce a first/second current draw difference between 1) the sum of the first input current draw and the second input current draw, and 2) the first/second input current limit such that stranded power on the at least one first power conversion device and the at least one second power conversion device is reduced.

15. The method of claim 14, further comprising:
determining, by the power management subsystem, whether the first input current draw exceeds a first input current limit that is based on the first over-current protection subsystem; and
throttling, by the power management subsystem in response to the first input current draw and exceeding the first input current limit, the at least one computing component to:
lower the first input current draw below the first input current limit; and
reduce a first current draw difference between the first input current draw and the first input current limit such that stranded power on the at least one first power conversion device is reduced.

16. The method of claim 15, further comprising:
determining, by the power management subsystem, whether the second input current draw exceed a second input current limit that is based on the second over-current protection subsystem; and
throttling, by the power management subsystem in response the second input current draw exceeding the second input current limit, the at least one computing component to:
lower the second input current draw below the second input current limit; and
reduce a second current draw difference between the second input current draw and the second input current limit such that stranded power on the at least one second power conversion device is reduced.

17. The method of claim 16, wherein the second input current limit is different than the first input current limit.

18. The method of claim 14, further comprising:
receiving, by the power management subsystem through a network from an administrator device, the first/second input current limit.

19. The method of claim 14, further comprising:
retrieving, by the power management subsystem, a computing device power budget for the computing device; and
automatically determining, by the power management subsystem using the computing device power budget, the first/second input current limit.

20. The method of claim 14, further comprising:
Adjusting, by the power management subsystem, the first/second input current limit to reduce the first/second current draw difference between 1) the sum of the first input current draw and the second input current draw and 2) the first/second input current limit.

* * * * *

UNITED STATES PATENT AND TRADEMARK OFFICE
CERTIFICATE OF CORRECTION

| | | |
|---|---|---|
| PATENT NO. | : 11,520,396 B2 | Page 1 of 1 |
| APPLICATION NO. | : 16/950572 | |
| DATED | : December 6, 2022 | |
| INVENTOR(S) | : Jenne et al. | |

It is certified that error appears in the above-identified patent and that said Letters Patent is hereby corrected as shown below:

In the Claims

Claim 7, Column 28, Line 20, "the at least one" should be changed to --at least one--

Signed and Sealed this
Twenty-first Day of February, 2023

*Katherine Kelly Vidal*

Katherine Kelly Vidal
*Director of the United States Patent and Trademark Office*